United States Patent [19]

Howie, Jr.

[11] Patent Number: 5,469,758
[45] Date of Patent: Nov. 28, 1995

[54] KNOB WITH SOFT PLASTIC COVER

[75] Inventor: Robert K. Howie, Jr., Decatur, Ill.

[73] Assignee: The Grigoleit Company, Decatur, Ill.

[21] Appl. No.: 146,946

[22] Filed: Nov. 3, 1993

[51] Int. Cl.[6] .................................................. G05G 1/10
[52] U.S. Cl. ............................ 74/553; 16/118; 16/121; 16/DIG. 19
[58] Field of Search ................... 74/553, 558; 16/117, 16/118, 121, DIG. 18, DIG. 19, DIG. 30; 264/273, 274

[56] References Cited

U.S. PATENT DOCUMENTS

| | | | |
|---|---|---|---|
| 2,071,147 | 2/1937 | Watson | 74/558 |
| 2,425,611 | 8/1947 | Frost et al. | 292/347 |
| 3,468,020 | 9/1969 | Carlson et al. | 264/274 X |
| 3,543,329 | 12/1970 | Gulette et al. | 16/121 |
| 4,094,210 | 7/1978 | Wirtz et al. | 74/553 |
| 4,165,659 | 8/1979 | Fawley | 74/558 |

Primary Examiner—Charles A. Marmor
Assistant Examiner—Mary Ann Battista
Attorney, Agent, or Firm—Dorn, McEachran, Jambor & Keating

[57] ABSTRACT

A composite knob having an elongated, cylindrical, inner core molded of a relatively stiff plastic and a partial outer covering of a soft resilient plastic molded to the inner core. Anchoring cavities are provided in ribs of the inner core to receive plugs of the soft plastic of the outer covering to anchor the outer covering to the inner core. In a modified embodiment, the ribs are tapered axially rearwardly and the outer covering is formed with rib-like extensions to engage said tapered ribs.

8 Claims, 2 Drawing Sheets

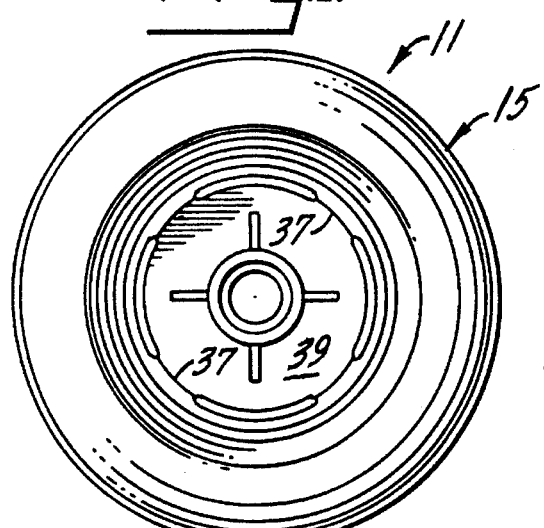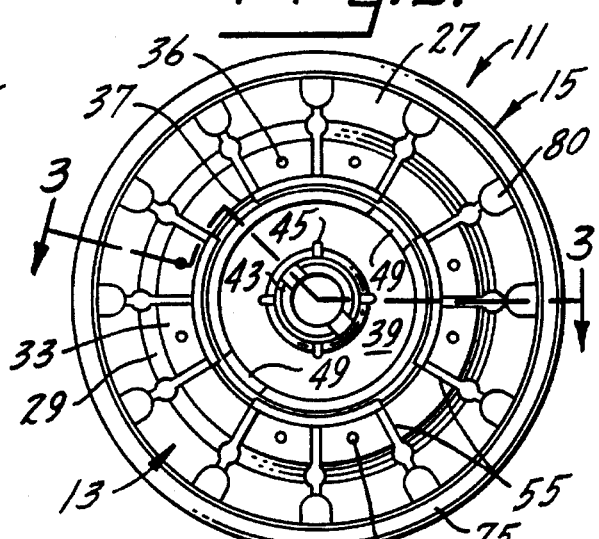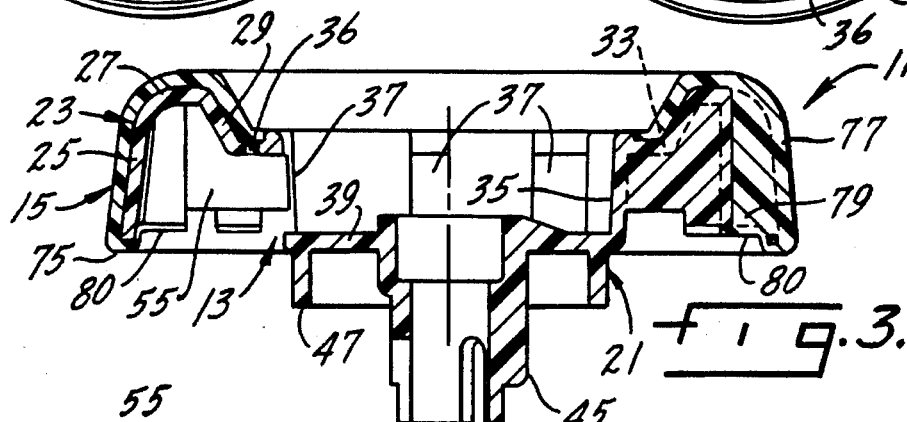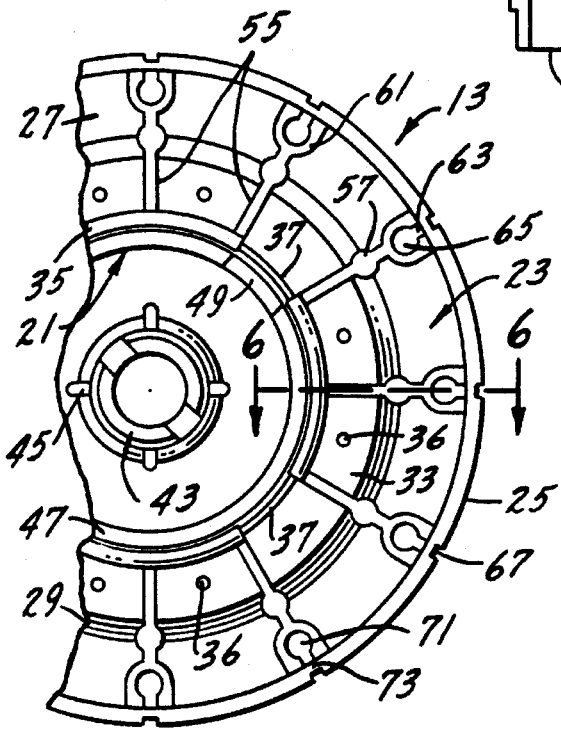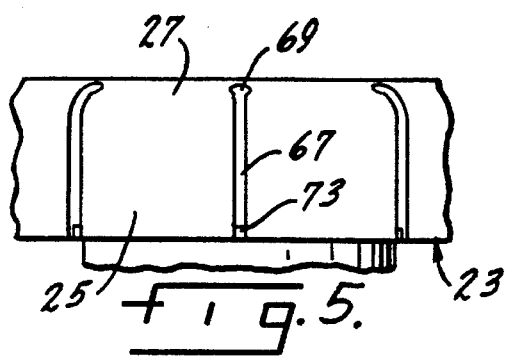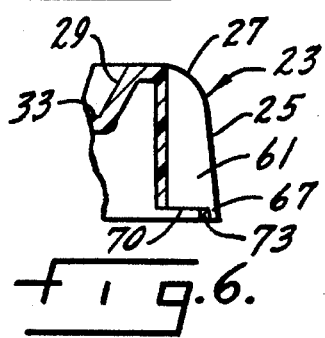

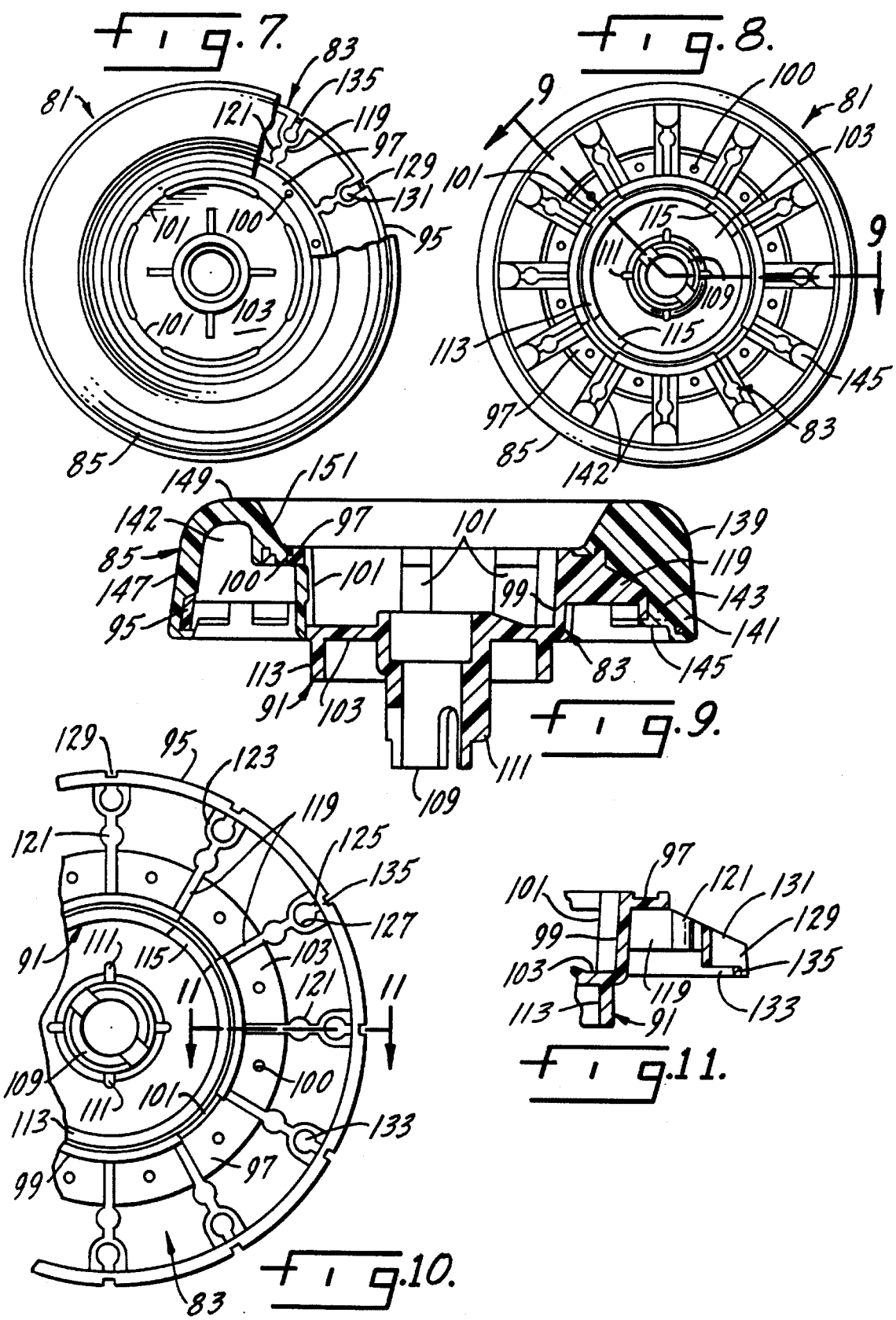

5,469,758

KNOB WITH SOFT PLASTIC COVER

SUMMARY OF THE INVENTION

This invention is directed to an injection molded plastic knob having a stiff inner core partially covered by a molded soft outer covering. As is conventional in composite knobs of this type, the inner core is initially injection molded and is then transferred to a second mold having a cavity which is sufficiently large to receive the inner core and has additional void spaces communicating with the inner core receiving cavity to receive additional injection molded plastic which forms the soft outer covering of the composite knob. In the manufacture of such a knob, it is important that the soft outer covering remains securely fastened to the hard inner core throughout the entire useful life of the knob. Mere adherence between the surfaces of the soft outer covering and the surfaces of the inner core has sometimes been found not to be sufficient to hold the composite knob together over a long period of use. Attempts have been made to anchor the soft outer covering to the core by forming relatively wide notches and passages, both wide and narrow, in the hard inner core and then flowing the molten plastic of the soft outer covering into and through these notches and passages. A construction of this type has not always provided the desired anchoring qualities and often requires excessive material to provide satisfactory anchoring.

It has been determined that the permanent attachment of a soft outer covering to a hard inner core is better accomplished by the provision of anchoring cavities formed as elements of the hard inner core which cavities are filled with the later injected material of the soft outer covering so as to secure the soft outer covering against separation from the inner core caused by axial, radial, and torque forces which will be applied during the commercial use of the knob.

Accordingly, it is an object of this invention to provide a composite knob having a hard plastic inner core and a soft, flexible outer covering of plastic which is securely anchored to the inner core.

Another object of this invention is a composite knob in which the soft outer plastic covering is attached to the hard inner core by integral plugs of the soft outer material which are formed in anchoring cavities located on the inside of the inner core.

Another object of this invention is a composite knob in which the soft outer covering is attached to the hard inner core through means of plugs of the soft outer covering molded in anchoring cavities formed in ribs of the inner core.

Another object of this invention is a composite knob in which the anchoring plugs resist radial displacement of the soft outer covering from the hard inner core.

Another object of this invention is a composite knob in which the soft feel of the outer plastic covering is enhanced by reducing the structural extent of the inner core without diminishing the anchoring characteristics of the inner core.

Another object of this invention is a composite knob in which the soft feel of the outer plastic covering is enhanced by replacing portions of the hard inner core with extensions of the outer covering.

Other objects may be found in the following specification, claims, and drawings.

BRIEF DESCRIPTION OF THE DRAWINGS

The invention is illustrated more or less diagrammatically in the following drawings wherein:

FIG. 1 is a front plan view of a first embodiment of the composite knob of this invention;

FIG. 2 is a rear plan view of the composite knob of FIG. 1;

FIG. 3 is an enlarged, cross sectional view taken along line 3—3 of FIG. 2;

FIG. 4 is an enlarged, partial rear plan view of the inner core of the composite knob before molding of the outer covering to the inner core;

FIG. 5 is a partial side elevational view of the inner core of FIG. 4;

FIG. 6 is a cross sectional view taken along line 6—6 of FIG. 4;

FIG. 7 is a front plan view of a second embodiment of this invention with a portion of the outer covering broken away;

FIG. 8 is a rear plan view of the composite knob of FIG. 7;

FIG. 9 is an enlarged, cross sectional view taken along line 9—9 of FIG. 8;

FIG. 10 is an enlarged, partial, rear plan view of the inner core before molding of the outer covering thereto; and FIG. 11 is a cross sectional view taken along line 11—11 of FIG. 10.

BRIEF DESCRIPTION OF THE PREFERRED EMBODIMENTS

FIGS. 1 through 6 of the drawings show one embodiment of the invention in a composite knob 11 which includes an inner core 13 of a hard, injection molded plastic material and an outer partial covering 15 of a soft, injection molded plastic material. The inner core 13 includes an inner cylindrical hub 21, an outer circumferential wall 23 which has a rim portion 25, a curved front portion 27, and a reentry portion 29. An annular partition 33 extends between the reentry portion 29 of the outer circumferential wall and a tubular wall 35. A number of small, longitudinally extending, circular passages 36 are formed in the annular partition 33. In this embodiment, three passages 36 are formed in each quadrant of the annular partition. The tubular wall is formed with four rectangular openings 37 each located 90° apart around the circumference of the wall. At the bottom of the tubular wall 35 there is a circular partition 39 which is formed integrally with the inner hub 21.

A shaft receiving tube 43 extends rearwardly of the circular bottom partition 39. This tube has four radially extending fins 45 on the exterior thereof and is surrounded by a relatively short skirt 47 which extends from the circular bottom partition 39 to encircle the tube 43. A pair of diametrically opposed tabs 49 extend axially rearwardly of the skirt.

A plurality of radially extending ribs 55 are formed rearwardly and inwardly of the outer circumferential wall 23 to connect the wall to the inner hub 21. Located intermediate the radial length of each rib is a cylindrical portion 57 which aligns with a knockout pin of the molding apparatus which removes the inner core 13 from its mold after the molding process. The ribs split into U-shaped walls 61 immediately inwardly of the outer circumferential wall 23 to form anchoring cavities 63 each having an enlarged portion 65. Narrow passages 67 formed in the outer circumferential wall 23 extend into the anchoring cavities 63. At the front end of the outer circumferential wall 23 the enlarged portions 65 of the anchoring cavities 63 are formed with circular openings 69 while at the rear of the anchoring cavities there are circular openings 71. A web 73 partially closes each narrow passage 67 at the rear of the outer circumferential wall 23 as can be seen most clearly in FIGS. 5 and 6 of the drawings.

The soft plastic material forming the relatively thin outer partial covering 15 flows into the void spaces in the mold through circular opening 71 of an anchoring cavity 63 and out through the narrow passage 67 and circular opening 69 to cover the front surface of the outer circumferential wall 23 of the inner core 13. The soft plastic material flows back into the other anchoring cavities 63 through their narrow passages 67 and circular openings 69. The circumferential wall 23 includes the rim portion 25, curved front portion 27 and reentry portion 29. The flowing soft plastic material also covers the small annular partition 33 and fills the passages 36 in this partition. At the rim portion, the soft plastic material covers the rear edge of the rim at 75 engulfing the webs 73 at the rear of the narrow passages 67. The soft plastic material also forms fingers 77 which extend through the narrow passages 67 in the circumferential wall 23 and form plugs 79 of soft plastic material in the enlarged portions 65 of the anchoring cavities 63. The soft material of the outer covering also extrudes through the openings 71 at the rear of the enlarged portions 65 of the anchoring cavities 63 to form anchoring tabs 80. Thus, the material of the outer covering 15 which extrudes into the passages 36 in the annular partition 33 anchors the inner periphery of the outer covering. The tabs 80, also formed by the soft material of the outer covering, assist in anchoring the outer periphery of the outer covering. However, the outer covering is primarily anchored by the plugs 79 which are molded in the anchoring cavities 63 and resist radial separation of the outer covering 15 from the inner core 13. It should be noted that the soft plastic material of the outer covering need be introduced through only one circular opening 71 of one anchoring cavity and any of the twelve anchoring cavities 63 may be utilized so that orientation problems are minimized.

A second embodiment of the invention is found in the composite knob 81 depicted in FIGS. 7 through 11 of the drawings. The composite knob 81 includes an inner core 83 of a hard, injection molded plastic and an outer partial covering 85 of a soft, injection molded plastic. The inner core 83 includes an inner cylindrical hub 91, a narrow outer rim 95, and an annular partition 97 which connects with a tubular wall 99. A number of small, longitudinally extending, circular passages 100 are formed in the annular partition 97. In this embodiment, three passages 100 are formed in each quadrant of the annular partition. The tubular wall 99 is formed with four rectangular openings 101 each located 90° apart around the circumference of the wall. At the bottom of the tubular wall 99 there is a circular partition 103 which is formed integrally with the inner hub 91.

A shaft receiving tube 109 extends axially rearwardly of the circular bottom wall 103. This shaft has four radially extending fins 111 on the exterior thereof and is surrounded by a relatively short skirt 113 which extends from the circular bottom wall 103 to encircle the shaft receiving tube 109. A pair of diametrically opposed tabs 115 extend axially rearwardly of the skirt.

A plurality of radial extending ribs 119 are formed rearwardly of the outer rim 95 and connect the narrow outer rim to the inner hub 91. The front surfaces of the ribs 119 are sloped axially rearwardly from the inner hub 91 to the outer rim 95. Located intermediate the radial length of each rib is a cylindrical portion 121 which aligns with a knockout pin of the molding apparatus to remove the inner core 83 from its mold after the molding process. The ribs split into U-shaped walls 123 immediately inwardly of the outer rim 95 to form anchoring cavities 125 having enlarged portions 127. Narrow passages 129 formed in the outer rim 95 extend into the anchoring cavities 125. The flowing plastic of the outer covering encases the sides of the ribs 119 at 142.

At the front of the ribs the enlarged portions 127 of the anchoring cavities 125 are formed with circular openings 131 while at the rear of the anchoring cavities there are circular openings 133. A web 135 partially closes the narrow passages 129 at the rear of the outer rim 95 as can be seen most clearly in FIGS. 10 and 11 of the drawings.

The soft plastic material forming the outer partial covering 85 flows through circular opening 133 of an anchoring cavity 125 and out through the narrow passage 129 into the void spaces in the mold to form the forwardly projecting extensions 139 of the ribs 119 which extensions are integral with the outer covering 85. The soft flowing plastic material flows back into the other anchoring cavities 125 through their narrow passages 129. The rib extensions 139 are anchored to the ribs 119 by integral fingers 141 of soft plastic material which extend through the narrow passages 129 of the ribs and by elongated plugs 143 of the same plastic material which are formed in the enlarged portions 127 of the anchoring cavities 125. The flowing soft plastic material covers the small annular partition 97 and fills the passages 100 in this partition. The soft plastic of the outer covering 85 also wraps around the rear edge of the narrow outer rim 95 and covers the webs 135 at the rear outlets of the narrow passages 129 to form tabs 145. Thus, the material of the outer covering 85 which extrudes into the passages 100 in the annular partition 97 anchors the inner periphery of the outer covering and the tabs 145 assist in anchoring the outer periphery of the outer covering. It should be noted that the soft plastic material of the outer covering need be introduced through only one circular opening 133 of one anchoring cavity 125 and any one of the twelve anchoring cavities 125 may be utilized so that orientation problems are minimized. Resistance to separation of the outer covering and hard inner core is enhanced by the plugs 143 molded into the anchoring cavities 125. The outer partial covering 85 of soft plastic material has a rim portion 147, a curved front portion 149 and a reentry portion 151 with the thickness of the outer covering being greater than the thickness of the outer covering 15 of the embodiment of FIGS. 1 to 6 of the invention except radially outwardly of the outer narrow rim 95 where it is approximately the same thickness as the outer covering 15. It should be noted that except at the outer narrow annular rim 95, the annular partition 97 and the ribs 119, the outer covering 85 does not engage the hard inner core 83. Thus, the provision of the rib extensions 139 and the reduction in the extent of the inner core 83 provides a knob with an outer covering that is much softer to the touch than is the composite knob 11 of the embodiment of FIGS. 1 to 6 of the drawings.

It should be appreciated that although I have described the composite knobs 11 and 81 as having inner cores 13 and 83 each formed of a hard, injection molded plastic material and the outer partial coverings 15 and 85 each formed of a soft, injection molded plastic material that my invention is not limited to products made of such materials. My invention is much broader in scope because the inner core and the outer covering may be formed of practically any moldable plastic material subject only to the limitation that the characteristics of the material of one is different from the characteristics of the material of the other in order to provide the composite knob with the characteristics sought after that would not be available in a knob formed of a single material. Further, the inner cores 13 and 83 may be formed of metal as by stamping or die casting. Thus, the materials of the inner core and the outer partial covering may differ insofar as their durometers, colors, transparities, translucencies, opacities, abilities to receive and retain plating, etc. are concerned. My invention is also applicable to a composite knob having a core and an outer covering of the same material where it is desired to form the knob as a laminate rather than in one piece.

I claim:

1. A composite knob including:

an elongated, cylindrical, inner core made of a relatively stiff plastic and having a partial outer covering of a soft, resilient plastic molded to said inner core, said inner core having an inner hub, an outer circumferential wall encircling said inner hub, and radially extending ribs connecting said outer circumferential wall and said inner hub, said outer circumferential wall having an outer surface and an inner surface, each of said ribs having an axial length and a rear axial surface, anchoring cavities for said outer covering formed in said ribs radially inwardly of said outer circumferential wall, and said anchoring cavities communicating with said outer surface of said outer circumferential wall through narrow passages formed in said wall to receive plugs of said soft, resilient plastic of said outer covering to anchor said outer covering to said core.

2. The composite knob of claim 1 in which said anchoring cavities extend along the axial lengths of said ribs.

3. The composite knob of claim 2 in which said anchoring cavities are wider than said narrow passages to enable said soft, resilient plastic to form anchoring plugs which are wider than said narrow passages.

4. The composite knob of claim 1 in which said soft resilient plastic of said partial outer covering extends rearwardly through openings in said anchoring cavities which extend through the rear axial surfaces of said ribs to partially cover said rear axial surfaces of said ribs.

5. The composite knob of claim 1 in which said soft, resilient plastic of said partial outer covering abuts said ribs and the rear axial surfaces thereof.

6. The composite knob of claim 1 in which said partial outer covering is engaged by said outer circumferential wall of said inner core throughout substantially the entire extent of said partial outer covering.

7. The composite knob of claim 1 in which said outer circumferential wall is a narrow rim, said ribs taper axially rearwardly from said inner hub to said narrow rim, said partial outer covering engages said inner core only at said narrow rim, said ribs and said inner hub.

8. The composite knob of claim 7 in which said engagement between said partial outer covering and said ribs involves rib-like extensions of said partial outer covering engaging said tapered ribs.

* * * * *